(12) United States Patent
Kolman et al.

(10) Patent No.: US 9,985,980 B1
(45) Date of Patent: May 29, 2018

(54) ENTROPY-BASED BEACONING DETECTION

(71) Applicant: EMC Corporation, Hopkinton, MA (US)

(72) Inventors: Eyal Kolman, Tel-Aviv (IL); Kineret Raviv, Herzeliya (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 120 days.

(21) Appl. No.: 14/969,801

(22) Filed: Dec. 15, 2015

(51) Int. Cl.
  *G06F 11/00* (2006.01)
  *G06F 12/14* (2006.01)
  *G06F 12/16* (2006.01)
  *G08B 23/00* (2006.01)
  *H04L 29/06* (2006.01)

(52) U.S. Cl.
  CPC .................... *H04L 63/1416* (2013.01)

(58) Field of Classification Search
  CPC ............. H04L 63/1416; H04L 63/1425; H04L 63/1441; H04L 41/142; H04L 63/1408; H04L 43/08; H04L 67/22; G06F 21/554; G06F 21/552
  See application file for complete search history.

(56) References Cited

U.S. PATENT DOCUMENTS

| | | | |
|---|---|---|---|
| 8,479,276 B1 | 7/2013 | Vaystikh et al. | |
| 8,904,525 B1 | 12/2014 | Hodgman et al. | |
| 8,904,531 B1 | 12/2014 | Saklikar et al. | |
| 9,154,516 B1 | 10/2015 | Vaystikh et al. | |
| 9,154,556 B1 | 10/2015 | Dotan et al. | |
| 9,367,687 B1 | 6/2016 | Warshenbrot | |
| 9,800,601 B2 * | 10/2017 | Bailey | H04L 63/1425 |
| 2010/0235915 A1 * | 9/2010 | Memon | H04L 63/145 |
| | | | 726/23 |
| 2013/0104230 A1 * | 4/2013 | Tang | G06F 21/552 |
| | | | 726/23 |
| 2015/0304350 A1 * | 10/2015 | Lin | H04L 63/1416 |
| | | | 726/23 |

OTHER PUBLICATIONS

Eyal Kolman, et al.; "Secure Fraud Detection"; U.S. Appl. No. 14/753,432, filed Jun. 29, 2015.

(Continued)

*Primary Examiner* — Kambiz Zand
*Assistant Examiner* — Arezoo Sherkat
(74) *Attorney, Agent, or Firm* — BainwoodHuang (57) ABSTRACT

A method includes (a) collecting information on times at which domains were contacted by each device of a set of devices on a network, (b) for each domain contacted by the set of devices, recording a list of time gaps between subsequent contacts to that domain by each device, (c) for each domain, calculating an entropy for the list of time gaps for that domain, a lower entropy indicating that that domain has been accessed at more regular intervals, while a higher entropy indicates that that domain has been accessed at more random intervals, (d) selecting a subset of the set of domains having smaller entropies relative to other domains of the set of domains, and (e) presenting the selected subset to an administrator with directions to review domains of the subset for potential contact with malware installed on devices of the computer network.

9 Claims, 5 Drawing Sheets

(56) References Cited

OTHER PUBLICATIONS

"Detecting malware beacons using Splunk", Geekery, Dec. 20, 2012, accessed from <https://pleasefeedthegeek.wordpress.com/2012/12/20/detecting-malware-beacons-using-splunk/> on Mar. 1, 2017, 3 pages.

"Advanced Threat Detection and Response", Splunk, 2014, accessed from <https://www.splunk.com/web_assets/pdfs/secure/Splunk_for APT_Tech_Brief.pdf> on Nov. 17, 2015, 4 pages.

* cited by examiner

ENTROPY-BASED BEACONING DETECTION

BACKGROUND

Malware and other malicious remote access tools may be installed on computing devices in order to allow a remote command-and-control (C&C) site to surreptitiously access the device across a network, even through a firewall. One technique that malware uses is called beaconing. Beaconing involves the malware sending a signal to the C&C site every so often so that the C&C site is able to establish a connection with the malware even if network address translation (NAT) is used. Malware typically performs beaconing in a periodic fashion (e.g., sending a keep-alive signal to the C&C site every 5 minutes).

Some conventional malware detection and prevention tools use a technique called beaconing detection to detect this periodic beaconing. Since human users typically access remote sites in a non-periodic fashion, malware detection and prevention tools are able to flag sites that are accessed at fixed periodicities as potential malware.

SUMMARY

Unfortunately, simple beaconing detection approaches according to conventional techniques can be overcome by using non-fixed beaconing periods. For example, some malware uses two different beaconing periods (e.g., alternating between 1 minute and 5 minutes) to avoid beaconing detection. It is also conceivable that more advanced malware programs may begin using even more than two beaconing periods.

Thus, it would be desirable for malware detection software to be able to perform beaconing detection that is not susceptible to use of more than one beaconing periodicity. This may be accomplished by using the entropy of time gaps between consecutive communications with various domains. Since human access to most domains is very irregular, time gaps between consecutive accesses have a relatively high data entropy. However, even if several periodicities are used by malware in performing beaconing, the entropy of the time gaps between consecutive beaconing attempts is still very regular, having a relatively low entropy. Thus, instead of looking for domains that are accessed by devices on the network at a single fixed periodicity, improved techniques calculate an entropy of binned time gaps between consecutive communications with each domain, looking for domains that have very low entropy in the time gaps.

In one embodiment, a method performed by a computing device, of identifying potential malware within a computer network is disclosed. The method includes (a) collecting information on times at which remote domains were contacted by each device of a set of devices on the computer network, (b) for each remote domain of a set of remote domains contacted by the set of devices, recording a list of time gaps between subsequent contacts to that remote domain by each device of the set of devices, (c) for each remote domain, calculating an entropy for the list of time gaps for that remote domain, a lower entropy indicating that that remote domain has been accessed at more regular intervals, while a higher entropy indicates that that remote domain has been accessed at more random intervals, (d) selecting a subset of the set of remote domains having smaller entropies relative to other remote domains of the set of remote domains, and (e) presenting the selected subset to an administrator with directions to review remote domains of the subset for potential contact with malware installed on devices of the computer network. An apparatus and computer program product for performing a similar method are also provided.

BRIEF DESCRIPTION OF THE DRAWINGS

The foregoing and other objects, features, and advantages will be apparent from the following description of particular embodiments of the present disclosure, as illustrated in the accompanying drawings in which like reference characters refer to the same parts throughout the different views.

DETAILED DESCRIPTION

Embodiments are directed to techniques for malware detection software to be able to perform beaconing detection that is not susceptible to use of more than one beaconing periodicity. This may be accomplished by using the entropy of time gaps between consecutive communications with various domains. Since human access to most domains is very irregular, time gaps between consecutive accesses have a relatively high data entropy. However, even if several periodicities are used by malware in performing beaconing, the entropy of the time gaps between consecutive beaconing attempts is still very regular, having a relatively low entropy. Thus, instead of looking for domains that are accessed by devices on the network at a single fixed periodicity, improved techniques calculate an entropy of binned time gaps between consecutive communications with each domain, looking for domains that have very low entropy in the time gaps.

Figure 1:
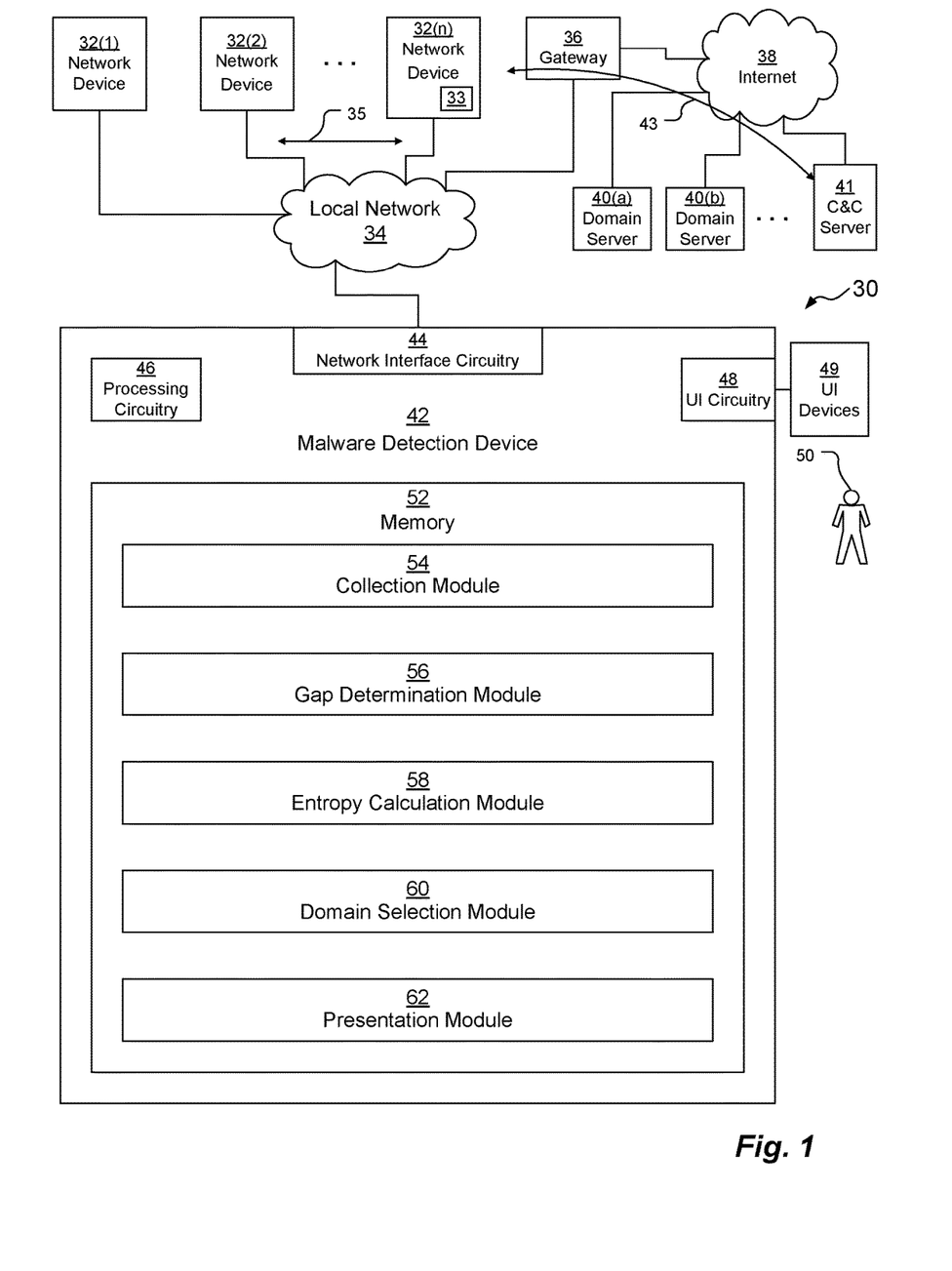
FIG. 1 is a block diagram depicting an example system and apparatus for use in connection with various embodiments.

FIG. 1 depicts a system 30. System 30 includes a set of network devices 32 (depicted as network devices 32(1), 32(2), . . . , 32(n)) connected to a local network 34. Network devices 32 may be any kind of computing devices configured to operate on a network, such as, for example, personal computers, workstations, server computers, laptop computers, tablet computers, smart phones, mobile computers, etc. or combinations thereof. Local network 34 may be any kind of computer network including, for example, a local area network, a wide area network, a storage area network, a virtual private network, a cellular data network, a set of point-to-point connections, a fabric of interconnected connections and switches, etc. or combinations thereof. Network traffic 35 may flow across network 34.

One or more gateways 36 are also connected to local network 34. A gateway 36 allows network devices 32 on the local network 34 to communicate outside of the local network 34, such as with the Internet 38 or a remote network (not depicted). As is well-known, the Internet contains a plurality of domain servers 40 (depicted as domain servers 40(1), 40(2), . . . ) that are responsible for serving content associated with respective domains. One of the domain servers 40 on the Internet 38 may be a command and control (C&C) server 41 configured to communicate with a piece of malware 33 installed on a network device 32 (e.g., network device 32(n)) on the local network 34 via a set of C&C signals 43 (which may include beaconing signals sent from the malware 33 to the C&C server 41).

Malware detection device 42 is also connected to local network 34. Malware detection device 42 and gateway 367 may also be considered network devices 32 in some embodiments. Malware detection device 42 may be any kind of computing device configured to operate on a network, such as, for example, a personal computer, workstation, server computer, laptop computer, tablet computer, smart phone, mobile computer, etc. or combinations thereof. In some embodiments, malware detection device 42 may be made up of several different computing devices each configured to perform a subset of the functions of the malware detection device 42, and one or more of these computing devices may not be connected directly to the local network 34.

Malware detection device 42 includes network interface circuitry 44, processing circuitry 46, memory 52, and user interface (UI) circuitry 48. Network interface circuitry 44 may include one or more Ethernet cards, cellular modems, Fibre Channel (FC) adapters, Wireless Fidelity (Wi-Fi) wireless networking adapters, and other devices for connecting to local network 34.

Processing circuitry 46 may be any kind of processor or set of processors configured to perform operations, such as, for example, a microprocessor, a multi-core microprocessor, a digital signal processor, a system on a chip, a collection of electronic circuits, a similar kind of controller, or any combination of the above.

UI circuitry 48 contains circuitry for interfacing with one or more UI devices 49 that allow one or more human users 50 to input and receive data to and from the malware detection device 42. For example, UI circuitry 48 may include a serial bus adapter, a graphics adapter, etc., while UI devices 49 may include one or more of a display device (e.g., a CRT, LCD, plasma, or LED monitor) and an input device (e.g., a mouse, trackpad, tracking stick, keyboard, keypad, microphone, biometric sensor, etc.).

Memory 52 may be any kind of digital system memory, such as, for example, random access memory (RAM). Memory 52 stores one or more operating systems in operation (not depicted, e.g., Linux, UNIX, Windows, MacOS, or a similar operating system), various applications executing on processing circuitry 46 as well as data used by those applications.

As depicted, memory 52 includes collection module 54, gap determination module 56, entropy calculation module 58, domain selection module 60, and presentation module 62. In other embodiments, these modules 54, 56, 58, 60, 62 may be distributed across more than one computing device, with the collection module 54 operating on a computing device attached to local network 34 and presentation module operating on a computing device having UI circuitry 48 connected to UI devices 49 for presentation of results to a human user 50. In some embodiments, the functionality of modules 54, 56, 58, 60, 62 may be divided in another manner rather than through these five modules. In some embodiments, instead of being stored in memory 52, one or more of modules 54, 56, 58, 60, 62 may be hard-coded into circuitry of malware detection device 42.

In some embodiments, memory 52 may also include a persistent storage portion (not depicted). Persistent storage may be made up of one or more persistent storage devices, such as, for example, hard disk drives, solid-state storage devices, flash drives, etc. Persistent storage is configured to store programs and data even while the malware detection device 42 is powered off. The OS (e.g., Linux, UNIX, Windows, or a similar operating system) and the applications (e.g., modules 54, 56, 58, 60, 62) are typically stored in persistent storage so that they may be loaded into memory 52 from persistent storage upon a system restart. These applications, when stored in non-transient form either in the volatile portion of memory 52 or in persistent storage, form a computer program product. The processing circuitry 46 running one or more of these applications thus forms a specialized circuit constructed and arranged to carry out the various processes described herein.

Figure 2:
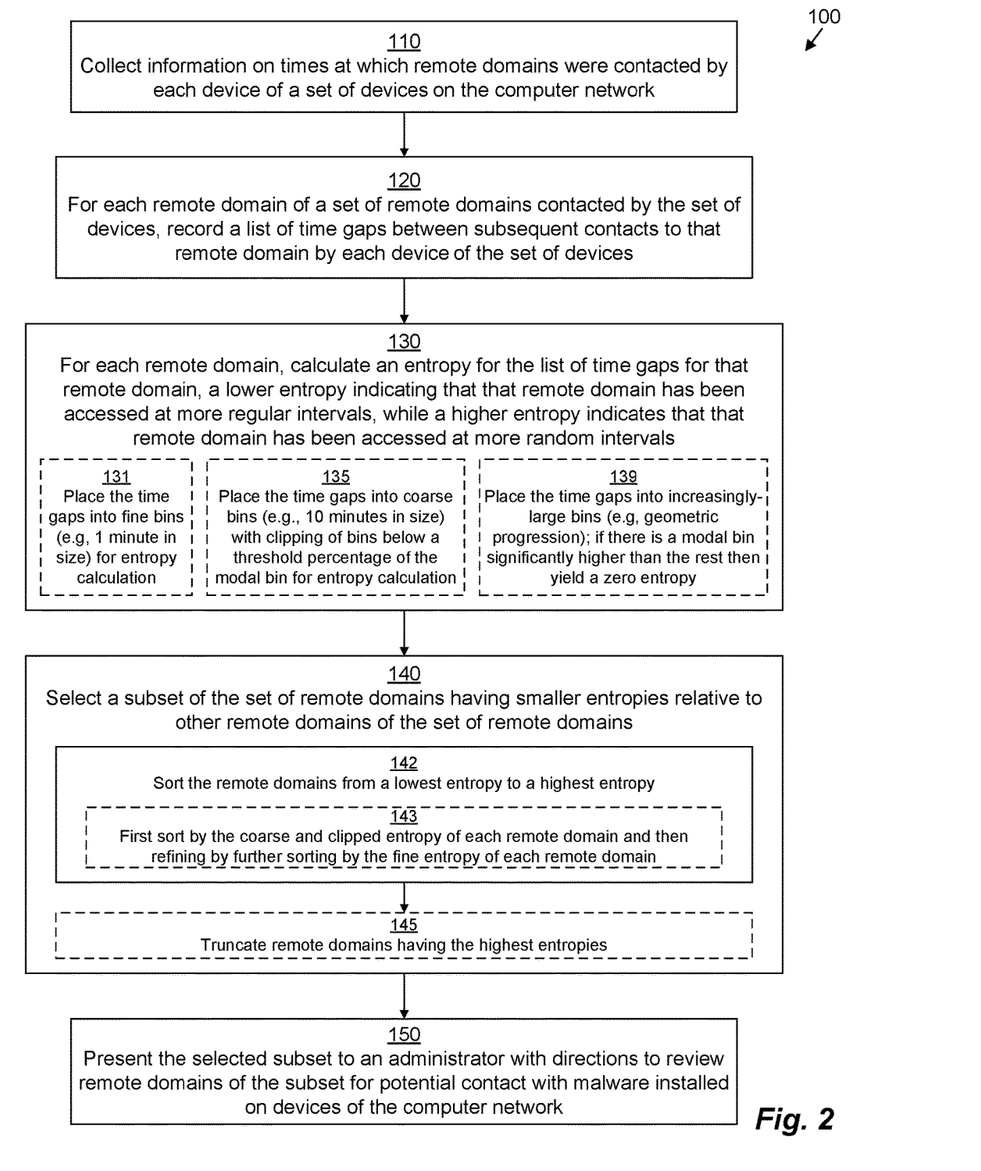
FIG. 2 is a flowchart depicting an example method according to various embodiments.

FIG. 2 illustrates an example method 100 performed by malware detection device 42 to identify a set of potential malware threats in network devices 32 of local network 34 for further analysis. It should be understood that any time a piece of software (e.g., module 54, 56, 58, 60, 62, etc.) is described as performing a method, process, step, or function, in actuality what is meant is that a computing device (e.g., malware detection device 42) or distributed computing system on which that piece of software is running performs the method, process, step, or function when executing that piece of software on its processing circuitry 46. It should be understood that although depicted in one order, one or more steps or sub-steps may be combined together or performed in a different order. It should be understood that, within FIG. 2, various sub-steps are dashed because they may be optional and not fundamental to method 100 or they may represent alternatives. However, it should be understood that, in some embodiments, one or more of the other steps may also be omitted. Similarly, in some embodiments, one or more steps may be combined together or performed in a different order.

In step 110, collection module 54 collects information on times at which remote domains (e.g., domains managed by domain servers 40) were contacted by each network device 32 of a set of devices on the local network 34. In some embodiments, collection module 54 may only collect this information for a subset of all network devices 32 on the local network 34, while, in other embodiments, collection module 54 collects this information for all network devices 32 on the local network 34. Generally, this only involves recording instances in which a network device 32 opens a communication session with a device on the Internet 38 (or other external network) through gateway 36. Step 110 may be performed by using packet sniffing techniques or it may be performed by obtaining records from gateway 36 or network devices 32. Although most of the communication sessions opened between network devices 32 and external domain servers 40 are likely to be harmless and normal, if there is malware 33 running on one or more of the network devices 32, then at least some of the communications are likely to be beaconing signals 43 to communicate with a C&C server 41. In some embodiments, collection module 54 stores the times of contact without using too high a degree of precision. Thus, for example, collection module 54 may store a time to the closest minute (or rounded to the last or next minute).

It should be understood that well-known techniques may be used to aggregate communications that may appear to be directed at different domains if they are in fact the same domain. Thus, even though one communication is directed to www.domain1.com and another communication is directed at web.domain1.com, these may be treated as being directed at the same domain. Similarly, even though one communication is directed to www.domain1.com and another communication is directed at www.domain2.com, these may be treated as being directed at the same domain if domain1 and domain2 are known to be under control of the same entity or if domain1 and domain2 are mere aliases to the same domain.

In some embodiments, certain remote domains may be excluded from the collection of step 110. For example, if a remote domain is known to be safe (i.e., a whitelisted non-C&C domain), then, collection module 54 may refrain from collecting connection information related to that remote domain. Information regarding which remote domains are to be excluded may be pre-programmed into the malware detection device 42 or it may be entered by a human user 50 via UI devices 49 and UI circuitry 48. This whitelisting may be useful for several reasons. One reason is that it reduces the number of entropy calculations that need be performed. Another reason is that it excludes some false positives from consideration by the system administrator 50 in identifying malware 33. Certain safe domains may be accessed in a regular way having low entropy. For example, the operating system of a computer may access the publisher of the operating system at regular intervals to check for system updates. As another example, an employee may access a news or sports site every day at lunch and during coffee breaks, but never during regular working hours; if the employee takes breaks every day at 10:15, 12:30, and 3:00, that site may have common time gaps of 135 minutes, 150 minutes, and 1155 minutes, which may indicate a very low entropy. Thus, the system administrator 50 may decide to whitelist that news or sports site to prevent that site from constantly being identified as potential malware.

In step 120, for each remote domain of a set of remote domains contacted by the set of network devices 32, gap determination module 56 records a list of time gaps between subsequent contacts to that remote domain by each network device 32 of the set of devices. Thus, if network device 32(*a*) communicates with domain domain1 at 1:23 pm and next communicates with domain1 at 1:28 pm, gap determination module 56 records a time gap of 5 minutes between communications with domain1 by network device 32(*a*). Them, if the next communication is at 1:39 pm, gap determination module 56 records another time gap of 11 minutes between communications with domain1 by network device 32(*a*). In some embodiments, if two communications between the same network device 32 and domain are both at the same rounded time, that time gap of zero is excluded from being recorded.

It should be understood that the list of time gaps may be aggregated across the network devices 32 on the local network 34. Thus, for example, assume that two network devices 32(1), 32(2) each access two different domains at different times according to Table 1, below.

TABLE 1

| Time | Network Device | Domain accessed |
|---|---|---|
| 1:00 | 32(1) | Domain1 |
| 1:00 | 32(1) | Domain1 |
| 1:01 | 32(1) | Domain1 |
| 1:01 | 32(2) | Domain1 |
| 1:02 | 32(2) | Domain2 |
| 1:05 | 32(1) | Domain1 |
| 1:06 | 32(2) | Domain1 |
| 1:11 | 32(1) | Domain2 |
| 1:13 | 32(2) | Domain2 |
| 1:15 | 32(1) | Domain2 |
| 1:18 | 32(1) | Domain1 |
| 1:20 | 32(2) | Domain2 |

In the example of Table 1 gap determination module 56 records the following time gaps for network device 32(1) with respect to Domain1: 0*, 1, 4, 13. However, since time gaps of length zero are excluded, only time gaps 1, 4, and 13 are recorded. Gap determination module 56 records the following time gap for network device 32(1) with respect to Domain2: 4. Gap determination module 56 records the following time gap for network device 32(2) with respect to Domain1: 5. Gap determination module 56 records the following time gaps for network device 32(2) with respect to Domain2: 11, 7.

Since time gaps are aggregated across network devices 32(1), 32(2), step 120 yields two lists, one for domain1 and one for domain2. The list for Domain1 is {1, 4, 5, 13} while the list for Domain2 is {4, 7, 11}.

In some embodiments, certain remote domains may be excluded from the set of remote domains in step 120. For example, if a remote domain is known to be safe (i.e., a whitelisted non-C&C domain), then, gap determination module 56 may refrain from recording the list of time gaps for that remote domain. Information regarding which remote domains are to be excluded may be pre-programmed into the malware detection device 42 or it may be entered by a human user 50 via UI devices 49 and UI circuitry 48.

In step 130, for each remote domain, entropy calculation module 58 calculates an entropy for the list of time gaps for that remote domain. A lower entropy indicates that that remote domain has been accessed at more regular intervals, while a higher entropy indicates that that remote domain has been accessed at more random intervals. In some embodiments, Shannon entropy is calculated as is well-known in the art.

In some embodiments, entropy calculation module 58 performs step 130 by performing sub-step 131. In sub-step 131, which is illustrated in further detail in FIG. 3A, entropy calculation module 58 effectively creates a fine-grained histogram by placing each time gap into one of a set of evenly-sized fine bins. In one embodiment, each fine bin has a size of 1 minute. Then, entropy calculation module 58 is able to calculate the entropy across the fine bins.

In other embodiments, entropy calculation module 58 performs step 130 by performing sub-step 135. In sub-step 135, which is illustrated in further detail in FIG. 4A, entropy calculation module 58 effectively creates a coarse-grained histogram by placing each time gap into one of a set of evenly-sized coarse bins. In one embodiment, each coarse bin has a size of 10 minutes. In addition, clipping is employed in order to eliminate bins that have fewer time gaps than a threshold percentage (e.g., 10%) of the modal bin, which is the coarse bin having the most time gaps assigned to it. This effectively smoothes out the histogram, eliminating any coarse bins that are almost empty. Then, entropy calculation module 58 is able to calculate the entropy across the coarse bins. In some embodiments, the threshold percentage may be in the range of 5% to 20%.

In some embodiments, both sub-steps 131 and 135 are performed in parallel.

In some embodiments, entropy calculation module 58 performs step 130 by performing sub-step 139 in conjunction with either sub-step 131 or sub-step 135. In sub-step 139, which is illustrated in further detail in FIG. 5A, entropy calculation module 58 effectively creates a non-linear histogram by placing each time gap into one of a set of increasingly-sized bins. In one embodiment, each of these bins is larger than the previous bin by a factor or ratio (i.e., according to a geometric progression). If it happens that the modal bin (the bin having the most time gaps assigned to it) has more time gaps assigned to it than any other bin by a certain factor (which is equivalent to saying that no other bin has at least a threshold percentage of the modal number of time gaps assigned thereto), then the modal bin is considered to represent a standard beaconing period, and entropy calculation module 58 assigns the remote domain an entropy of zero (or another extremely low value) without needing to perform an expensive entropy calculation. On the other hand, if the modal bin does not have more time gaps assigned to it than any other bin by the certain factor (which is equivalent to saying that at least one other bin has at least a threshold percentage of the modal number of time gaps assigned thereto), then either sub-step 131 or sub-step 135 is used to assign an entropy to the remote domain.

In some embodiments, certain remote domains may be excluded from the set of remote domains for which entropy is calculated in step 130. For example, if a remote domain is known to be safe (i.e., a whitelisted non-C&C domain), then, entropy calculation module 58 may refrain from calculating an entropy value for that remote domain. Information regarding which remote domains are to be excluded may be pre-programmed into the malware detection device 42 or it may be entered by a human user 50 via UI devices 49 and UI circuitry 48.

In step 140, domain selection module 60 selects a subset of the set of remote domains having smaller entropies relative to other remote domains of the set of remote domains. Typically, this step includes sorting the remote domains by their calculated entropies such that the remote domains having the lowest calculated entropies are first and the remote domains having the highest calculated entropies are last (sub-step 142). In some embodiments, domain selection module 60 performs sub-step 142 by performing sub-sub-step 143. In sub-sub-step 143, domain selection module 60 first performs an initial sort using the entropy values calculated with reference to the coarse bins of sub-step 135. Then, if any of the remote domains have an equal (tied) calculated entropy (or, in some embodiments, are within a threshold distance of each other, e.g., an entropy value within 0.01), domain selection module 60 then sorts between the tied remote domains using the entropy values calculated with reference to the fine bins of sub-step 131. In some embodiments, sub-step 131 is not performed for a remote domain unless and until domain selection module 60 determines (in sub-sub-step 143) that that remote domain is tied with another remote domain based on the coarsely-calculate d entropy values.

In some embodiments, the subset selected by the domain selection module 60 is the entire set of remote domains, sorted. However, in other embodiments (sub-step 145), domain selection module 60 truncates the sorted list of remote domains, removing remote domains at the end of the list (i.e., those having the highest calculated entropies).

In some embodiments, certain remote domains may be excluded from being in the subset of remote domains in step 140. For example, if a remote domain is known to be safe (i.e., a whitelisted non-C&C domain), then, domain selection module 60 may refrain from placing that remote domain in the subset. Information regarding which remote domains are to be excluded may be pre-programmed into the malware detection device 42 or it may be entered by a human user 50 via UI devices 49 and UI circuitry 48. This whitelisting may be useful because it excludes some false positives from consideration by the system administrator 50 in identifying malware 33, as mentioned above.

Finally, in step 150, presentation module 62 presents the selected subset of remote domains to a human administrator 50 (via UI circuitry 48 and UI devices 49) with directions to review remote domains of the subset for potential contact with malware 33 potentially installed on network devices 32 of the local network. In some embodiments, the presentation identifies which network devices 32 were in contact with each remote domain of the subset to simplify the malware detection process.

Figure 3A:
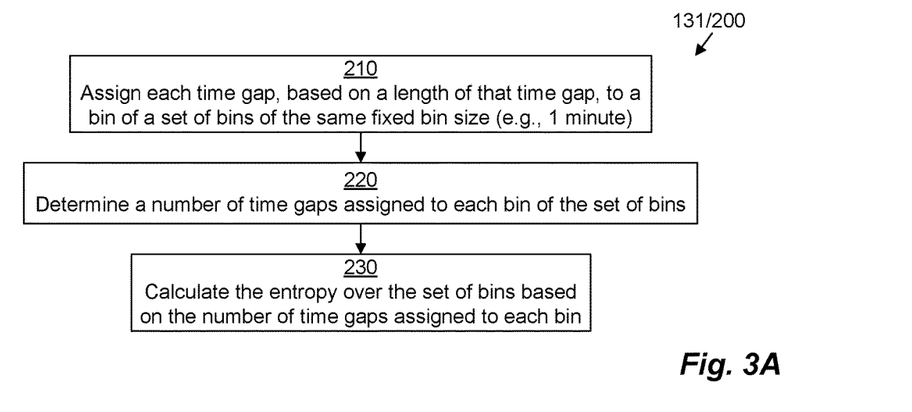
FIG. 3A is a flowchart depicting a portion of an example method according to various embodiments utilizing a fine-grained entropy scheme.

FIG. 3A illustrates sub-step 131 in further detail as method 200. Thus, in some embodiments, entropy calculation module 58 may perform method 200 for each of one or more remote domains in order to assess a fine-grained entropy. FIG. 3A may be better understood in the context of FIG. 3B, which depicts an example fine-grained histogram 270.

In step 210, entropy calculation module 58 assigns each time gap (for a given remote domain) based on a length of that time gap, to a bin of a set of bins of the same fixed bin size (e.g., 1 minute). Looking at FIG. 3B, there are various time gaps 274 for a particular remote domain which have been recorded by gap determination module 56 in step 120. Entropy calculation module 58 places each time gap into a particular fine bin 272 (depicted as fine bins 272(1), 272(2), 272(3), 272(4), 272(5), 272(6), 272(7), 272(8), . . . ) based on the length of that time gap 274. Thus, in the example of FIG. 3B, fine bin 272(1) stores time gaps having a length of 1 minute, fine bin 272(2) stores time gaps having a length of 2 minutes, etc. In some embodiments, another fixed fine bin size may be used (e.g., in the range of 1 second to 5 minutes).

Figure 3B:
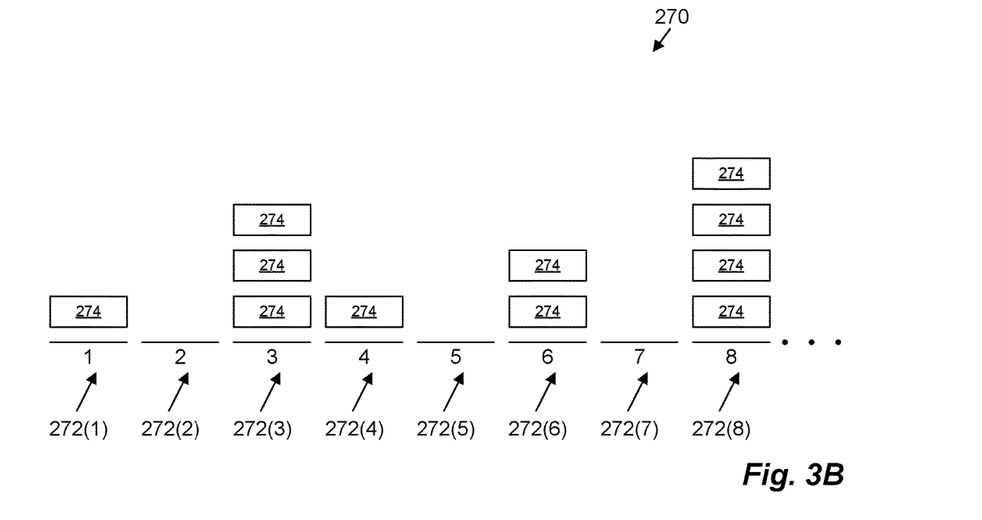
FIG. 3B is an example histogram depicting a fine-grained entropy scheme for use in connection with various embodiments.

In step 220, entropy calculation module 58 determines a number of time gaps 274 assigned to each bin 272. As depicted in FIG. 3B, for the given remote domain, there is 1 time gap 274 having a length of 1 minute, none having a length of 2 minutes, 3 time gaps having a length of 3 minutes each, 1 time gap having a length of 4 minutes, none having a length of 5 minutes, 2 time gaps having a length of 6 minutes each, none having a length of 7 minutes, and 4 time gaps having a length of 8 minutes each.

In step 230, entropy calculation module 58 calculates the entropy over the set of bins 272 based on the number of time gaps 274 assigned to each bin 272. Thus, for example, computing the Shannon entropy over the set $\{1, 0, 3, 1, 0, 2, 0, 4\}$ yields a resulting entropy value of approximately 2.15564.

Figure 4A:
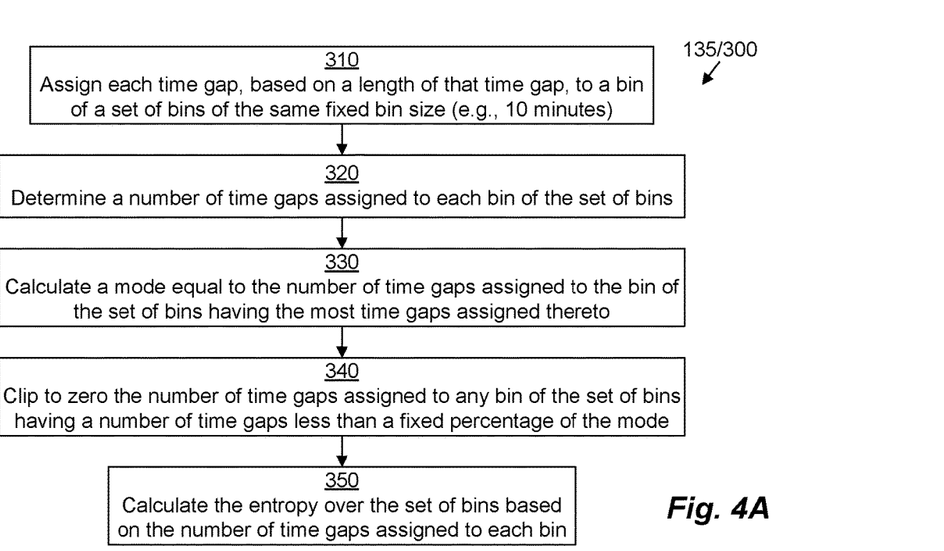
FIG. 4A is a flowchart depicting a portion of an example method according to various embodiments utilizing a coarse-grained entropy scheme.

FIG. 4A illustrates sub-step 135 in further detail as method 300. Thus, in some embodiments, entropy calculation module 58 may perform method 300 for each of one or more remote domains in order to assess a coarse-grained entropy. FIG. 4A may be better understood in the context of FIG. 4B, which depicts an example coarse-grained histogram 370.

In step 310, entropy calculation module 58 assigns each time gap (for a given remote domain) based on a length of that time gap, to a bin of a set of bins of the same fixed bin size (e.g., 10 minutes). Looking at FIG. 4B, there are various time gaps 374 for a particular remote domain which have been recorded by gap determination module 56 in step 120. Entropy calculation module 58 places each time gap 374 into a particular coarse bin 372 (depicted as coarse bins 372(1), 372(2), 372(3), 372(4), 372(5), 372(6), 372(7), . . . ) based on the length of that time gap 374. Thus, in the example of FIG. 4B, coarse bin 372(1) stores time gaps 374 having a length in the range of 1 minute to 10 minutes, coarse bin 372(2) stores time gaps 374 having a length in the range of 11 minutes to 20 minutes, etc. In some embodiments, another fixed coarse bin size may be used (e.g., in the range of 5 minutes to 20 minutes) rather than 10 minutes.

Figure 4B:
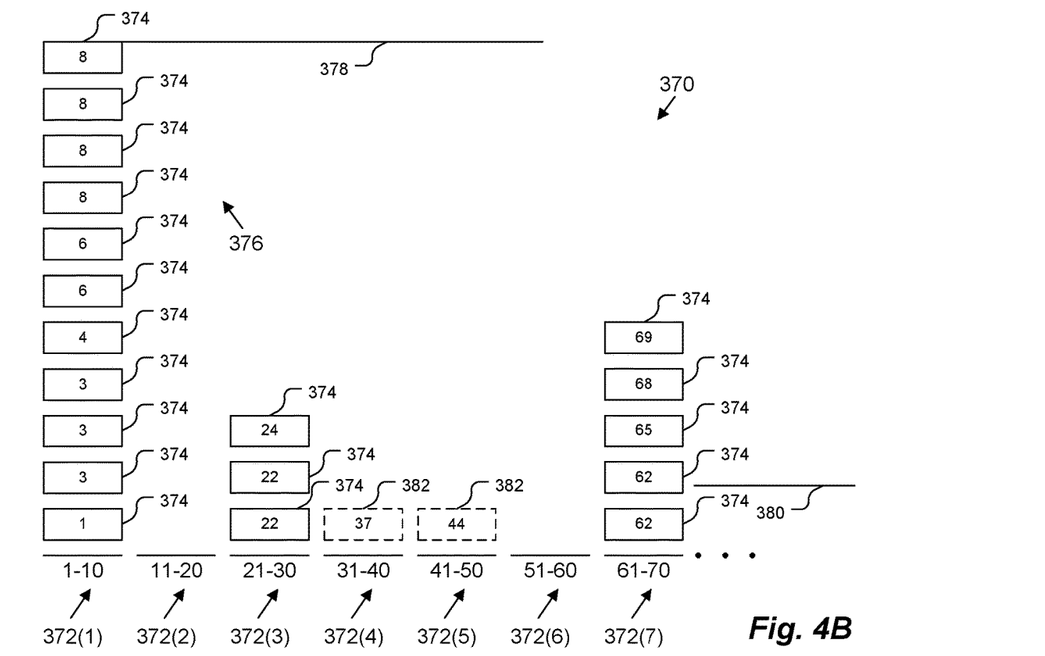
FIG. 4B is an example histogram depicting a coarse-grained entropy scheme for use in connection with various embodiments.

In step 320, entropy calculation module 58 determines a number of time gaps 374, 382 assigned to each bin 372. As depicted in FIG. 4B, for the given remote domain, there are 11 time gaps 374 having a length in the range of 1 minute to 10 minutes (i.e., 1 time gap 374 of length 1 minute, 3 time gaps of length 3 minutes, 1 time gap 374 of length 4 minutes, 2 time gaps of length 6 minutes, and 4 time gaps of length 8 minutes). In addition there are no time gaps 374 having a length in the range of 11 minutes to 20 minutes, 3 time gaps 374 having a length in the range of 21 minutes to 30 minutes (with lengths of 22, 22, and 24 minutes), 1 time gap 382 having a length in the range of 31 minutes to 40 minutes (with a length of 37 minutes), 1 time gap 382 having a length in the range of 41 minutes to 50 minutes (with a length of 44 minutes), no time gaps 374 having a length in the range of 51 minutes to 60 minutes, and 5 time gaps 374 having a length in the range of 61 minutes to 70 minutes (with lengths of 62, 62, 65, 68, and 69 minutes).

In step 330, entropy calculation module 58 calculates a mode 378 equal to the number of time gaps 374 assigned to the bin 372 having the most time gaps 374 assigned thereto. In the example of FIG. 4B, the modal bin 376 is bin 372(1) having 11 time gaps 374 assigned thereto, the mode 378 being 11.

In step 340, entropy calculation module 58 clips to zero the number of time gaps 374 assigned to any bin 372 having a number of time gaps 382 less than a fixed percentage (e.g., 10%) of the mode 378. In the example of FIG. 4B, since the mode 378 is 11, the clipping threshold 380 is 1.1; therefore, certain time gaps 374 are depicted as clipped time gaps 382 (drawn with dotted lines), if there are fewer than 1.1 time gaps 374 in a particular bin 372. Thus, instead of bins 372(4) and 372(5) having 1 time gap 382 each, they are regarded as having zero time gaps 374 each. In some embodiments, the threshold percentage may be in the range of 5% to 20%.

Finally, in step 350, entropy calculation module 58 calculates the entropy over the set of bins 372 based on the number of time gaps 374 assigned to each bin 372. Thus, for example, computing the Shannon entropy over the set {11, 0, 3, 0, 0, 0, 5} yields a resulting entropy value of approximately 1.6645.

Figure 5A:
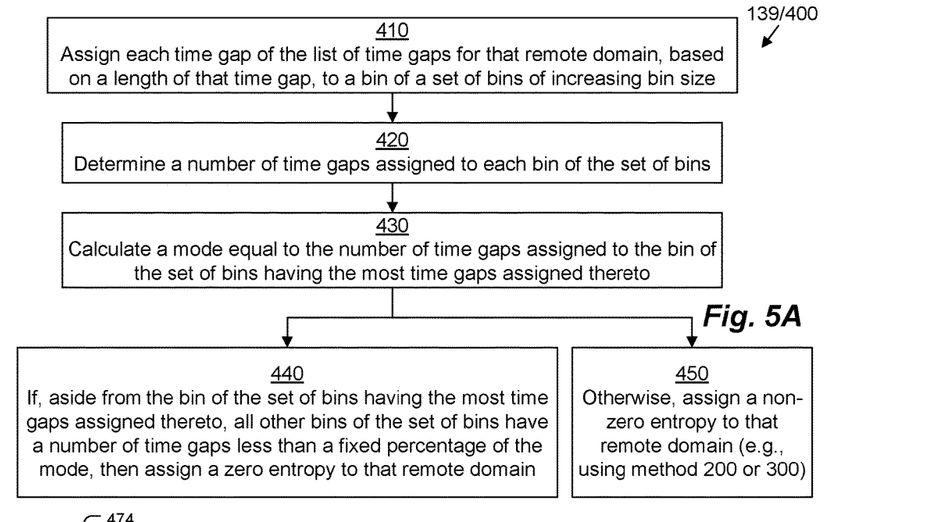
FIG. 5A is a flowchart depicting a portion of an example method according to various embodiments utilizing bins of increasing size.

FIG. 5A illustrates sub-step 139 in further detail as method 400. Thus, in some embodiments, entropy calculation module 58 may perform method 400 for each of one or more remote domains in order to assess the entropy without always necessitating a full entropy calculation. FIG. 5A may be better understood in the context of FIG. 5B, which depicts an example geometric progression histogram 470.

In step 410, entropy calculation module 58 assigns each time gap (for a given remote domain) based on a length of that time gap, to a bin of a set of bins of increasing bin size (e.g., a geometric progression). Looking at FIG. 5B, there are various time gaps 474 for a particular remote domain which have been recorded by gap determination module 56 in step 120. Entropy calculation module 58 places each time gap 474 into a particular bin 472 (depicted as coarse bins 472(1), 472(2), 472(3), 472(4), 472(5), 472(6), 472(7), . . . ) based on the length of that time gap 474. Thus, in the example of FIG. 5B, bin 472(1) stores time gaps 474 having a length in the range of 1 minute to 10 minutes, bin 472(2) stores time gaps 474 having a length in the range of 11 minutes to 30 minutes, bin 472(3) stores time gaps 474 having a length in the range of 31 minutes to 70 minutes, etc., each bin 472($n$) (starting with bin 472(2)) being twice as big as the previous bin 472($n-1$).

Figure 5B:
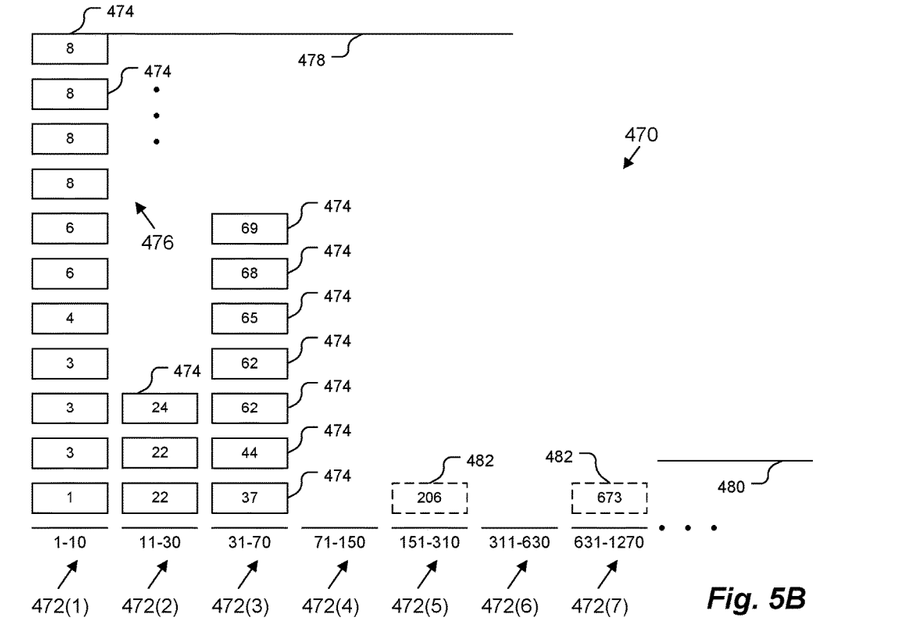
FIG. 5B is an example histogram utilizing bins of increasing size for use in connection with various embodiments.

In step 420, entropy calculation module 58 determines a number of time gaps 474, 482 assigned to each bin 472. As depicted in FIG. 5B, for the given remote domain, there are 11 time gaps 474 having a length in the range of 1 minute to 10 minutes (i.e., 1 time gap 474 of length 1 minute, 3 time gaps 474 of length 3 minutes, 1 time gap 474 of length 4 minutes, 2 time gaps 474 of length 6 minutes, and 4 time gaps 474 of length 8 minutes). In addition there are 3 time gaps 474 having a length in the range of 11 minutes to 30 minutes (with lengths of 22, 22, and 24 minutes), 7 time gaps 474 having a length in the range of 31 minutes to 70 minutes (with lengths of 37, 44, 62, 62, 65, 68, and 69 minutes), no time gaps 474 having a length in the range of 71 minutes to 150 minutes, 1 time gap 482 having a length in the range of 151 minutes to 310 minutes (with a length of 206 minutes), no time gaps 474 having a length in the range of 311 minutes to 630 minutes, and 1 time gap 482 having a length in the range of 631 minutes to 1270 minutes (with a length of 673 minutes.

In step 430, entropy calculation module 58 calculates a mode 478 equal to the number of time gaps 474 assigned to the bin 472 having the most time gaps 474 assigned thereto. In the example of FIG. 5B, the modal bin 476 is bin 472(1) having 11 time gaps 474 assigned thereto, the mode 478 being 11.

In step 440, if, aside from the modal bin 476, all other bins 472 have a number of time gaps 482 less than a clipping threshold 480 of a fixed percentage (e.g., 10%) of the mode 478, then entropy calculation module 58 assigns a zero entropy to that remote domain. In the example of FIG. 5B, since the mode 478 is 11, the clipping threshold 480 is 1.1; therefore, certain time gaps 474 are depicted as clipped time gaps 482 (drawn with dotted lines), if there are fewer than 1.1 time gaps 474 in a particular bin 472. Thus, instead of bins 472(5) and 472(7) having 1 time gap 482 each, they are regarded as having zero time gaps 474 each. However, since bins 472(2), 472(3) have a non-zero number of time gaps 474 assigned to them even after clipping, entropy calculation module 58 does not assign a zero entropy to that remote domain. In some embodiments, the threshold percentage may be in the range of 5% to 20%.

Instead, in step 450, if the condition of step 440 is not satisfied, entropy calculation module 58 assigns a non-zero entropy to that remote domain (e.g., using method 200 or 300).

Method 400 is useful because it permits the expensive entropy calculations used in methods 200 and 300 to be avoided when there is a clear modal periodicity indicative of beaconing, thus enhancing efficiency.

Thus, techniques for performing beaconing detection that is not susceptible to use of more than one beaconing periodicity have been provided. This may be accomplished by using the entropy of time gaps 274, 374 between consecutive communications with various domains. Since human access to most domains is very irregular, time gaps 274, 374 between consecutive accesses have a relatively high data entropy. However, even if several periodicities are used by malware in performing beaconing, the entropy of the time gaps between consecutive beaconing attempts is still very regular, having a relatively low entropy. Thus, instead of looking for domains that are accessed by network devices 32 on a local network 34 at a single fixed periodicity, improved techniques calculate an entropy of binned time gaps 274, 374 between consecutive communications with each domain, looking for domains that have very low entropy in the time gaps 274, 374.

While various embodiments of the present disclosure have been particularly shown and described, it will be understood by those skilled in the art that various changes in form and details may be made therein without departing from the spirit and scope of the present disclosure as defined by the appended claims.

For example, it should be understood that although various embodiments have been described as being methods, software embodying these methods is also included. Thus, one embodiment includes a tangible computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer that is programmed to perform one or more of the methods described in various embodiments.

It should be understood that all embodiments that have been described may be combined in all possible combinations with each other, except to the extent that such combinations have been explicitly excluded.

It should also be understood that the above-described techniques do not merely detect malware. Rather, the disclosed techniques involve identifying potential malware within a computer network. In particular, these techniques involve collecting information on times at which remote domains were contacted by each device 32 of a set of devices on the computer network 34, for each remote domain of a set of remote domains contacted by the set of devices 32 recording a list of time gaps between subsequent contacts to that remote domain by each device of the set of devices 32, for each remote domain calculating an entropy for the list of time gaps for that remote domain, selecting a subset of the set of remote domains having smaller entropies relative to other remote domains of the set of remote domains, and presenting the selected subset to an administrator 50 with directions to review remote domains of the subset for potential contact with malware 33 installed on devices 32 of the computer network 34. With these improved techniques, the a human system administrators 50 is able to effectively police network devices 32 on the local network 34 from malware 33 by allowing the human system administrator 50 to easily identify potential malware 33 in an effective manner based on identified beaconing activity.

Finally, even if a technique, method, apparatus, or other concept is specifically labeled as "conventional," Applicant makes no admission that such technique, method, apparatus, or other concept is actually prior art under 35 U.S.C. § 102 or 35 U.S.C. § 103, such determination being a legal determination that depends upon many factors, not all of which are known to Applicant at this time.

What is claimed is:

1. A method, performed by a computing device, of identifying potential malware within a computer network, the method comprising:
   collecting information on times at which remote domains were contacted by each device of a set of devices on the computer network, wherein collecting includes sniffing packets over the computer network from communication sessions between devices of the set of devices and the remote domains;
   for each remote domain of a set of remote domains contacted by the set of devices, recording a list of time gaps between subsequent contacts to that remote domain by each device of the set of devices;
   for each remote domain, calculating an entropy for the list of time gaps for that remote domain, a lower entropy indicating that that remote domain has been accessed at more regular intervals, while a higher entropy indicates that that remote domain has been accessed at more random intervals, wherein calculating the entropy includes:
      assigning each time gap, based on a length of that time gap, to a bin of a set of bins of a same fixed bin size;
      determining a number of time gaps assigned to each bin of the set of bins;
      calculating a mode equal to the number of time gaps assigned to the bin of the set of bins having the most time gaps assigned thereto;
      clipping to zero the number of time gaps assigned to any bin of the set of bins having a number of time gaps less than a fixed percentage of the mode; and
      calculating the entropy over the set of bins based on the number of time gaps assigned to each bin;
   selecting a strict subset of the set of remote domains, the calculated entropy of each remote domain of the strict subset being smaller than the calculated entropy of each remote domain of the set of remote domains not within the selected strict subset, wherein selecting the strict subset includes (a) sorting the remote domains from a lowest entropy to a highest entropy using the calculated entropy of each remote domain and then (b) refining by further sorting remote domains having equal calculated entropies by using another entropy calculated for those remote domains using a different fixed bin size; and
   presenting the selected strict subset to an administrator with directions to review remote domains of the strict subset for potential contact with malware installed on devices of the computer network.

2. The method of claim 1 wherein the fixed bin size is 1 minute.

3. The method of claim 1 wherein the fixed bin size is in a range of 5 minutes to 20 minutes and the fixed percentage is in a range of 5% to 20%.

4. The method of claim 1 wherein calculating the entropy further includes calculating the other entropy by:
   assigning each time gap, based on a length of that time gap, to another bin of another set of bins of a same other fixed bin size, the other fixed bin size being smaller than the fixed bin size;
   determining a number of time gaps assigned to each other bin of the other set of bins; and
      calculating the other entropy over the other set of bins based on the number of time gaps assigned to each other bin.

5. The method of claim 4 wherein the fixed bin size is in a range of 5 minutes to 20 minutes, the smaller fixed bin size is 1 minute, and the fixed percentage is in a range of 5% to 20%.

6. A computer program product comprising a non-transitory computer-readable storage medium storing a set of instructions, which, when executed by a computing device, causes the computing device to identify potential malware within a computer network by performing the following operations:
  collecting information on times at which remote domains were contacted by each device of a set of devices on the computer network, wherein collecting includes sniffing packets over the computer network from communication sessions between devices of the set of devices and the remote domains;
  for each remote domain of a set of remote domains contacted by the set of devices, recording a list of time gaps between subsequent contacts to that remote domain by each device of the set of devices;
  for each remote domain, calculating an entropy for the list of time gaps for that remote domain, a lower entropy indicating that that remote domain has been accessed at more regular intervals, while a higher entropy indicates that that remote domain has been accessed at more random intervals, wherein calculating the entropy includes:
    assigning each time gap, based on a length of that time gap, to a bin of a set of bins of a same fixed bin size;
    determining a number of time gaps assigned to each bin of the set of bins;
    calculating a mode equal to the number of time gaps assigned to the bin of the set of bins having the most time gaps assigned thereto;
    clipping to zero the number of time gaps assigned to any bin of the set of bins having a number of time gaps less than a fixed percentage of the mode; and
    calculating the entropy over the set of bins based on the number of time gaps assigned to each bin;
  selecting a strict subset of the set of remote domains, the calculated entropy of each remote domain of the strict subset being smaller than the calculated entropy of each remote domain of the set of remote domains not within the selected strict subset, wherein selecting the strict subset includes (a) sorting the remote domains from a lowest entropy to a highest entropy using the calculated entropy of each remote domain and then (b) refining by further sorting remote domains having equal calculated entropies by using another entropy calculated for those remote domains using a different fixed bin size; and
  presenting the selected strict subset to an administrator with directions to review remote domains of the strict subset for potential contact with malware installed on devices of the computer network.

7. The computer program product of claim 6 wherein calculating the entropy further includes calculating the other entropy by:
  assigning each time gap, based on a length of that time gap, to another bin of another set of bins of a same other fixed bin size, the other fixed bin size being smaller than the fixed bin size;
  determining a number of time gaps assigned to each other bin of the other set of bins; and
  calculating the other entropy over the other set of bins based on the number of time gaps assigned to each other bin.

8. An apparatus comprising:
  network interface circuitry for connecting to a computer network;
  user interface circuitry; and
  processing circuitry coupled to memory configured to identify potential malware within the computer network by performing the following operations:
    collecting, via the network interface circuitry, information on times at which remote domains were contacted by each device of a set of devices on the computer network, wherein collecting includes sniffing packets over the network interface circuitry from communication sessions between devices of the set of devices and the remote domains;
    for each remote domain of a set of remote domains contacted by the set of devices, recording a list of time gaps between subsequent contacts to that remote domain by each device of the set of devices;
    for each remote domain, calculating an entropy for the list of time gaps for that remote domain, a lower entropy indicating that that remote domain has been accessed at more regular intervals, while a higher entropy indicates that that remote domain has been accessed at more random intervals, wherein calculating the entropy includes:
      assigning each time gap, based on a length of that time gap, to a bin of a set of bins of a same fixed bin size;
      determining a number of time gaps assigned to each bin of the set of bins;
      calculating a mode equal to the number of time gaps assigned to the bin of the set of bins having the most time gaps assigned thereto;
      clipping to zero the number of time gaps assigned to any bin of the set of bins having a number of time gaps less than a fixed percentage of the mode; and
      calculating the entropy over the set of bins based on the number of time gaps assigned to each bin;
    selecting a strict subset of the set of remote domains, the calculated entropy of each remote domain of the strict subset being smaller than the calculated entropy of each remote domain of the set of remote domains not within the selected strict subset, wherein selecting the strict subset includes (a) sorting the remote domains from a lowest entropy to a highest entropy using the calculated entropy of each remote domain and then (b) refining by further sorting remote domains having equal calculated entropies by using another entropy calculated for those remote domains using a different fixed bin size; and
    presenting, via the user interface circuitry, the selected strict subset to an administrator with directions to review remote domains of the strict subset for potential contact with malware installed on devices of the computer network.

9. The apparatus of claim 8 wherein calculating the entropy further includes calculating the other entropy by:
  assigning each time gap, based on a length of that time gap, to another bin of another set of bins of a same other fixed bin size, the other fixed bin size being smaller than the fixed bin size;
  determining a number of time gaps assigned to each other bin of the other set of bins; and
  calculating the other entropy over the other set of bins based on the number of time gaps assigned to each other bin.

* * * * *